Aug. 8, 1939.  S. YEDA  2,168,464
ROENTGENOMETER
Filed Feb. 5, 1937
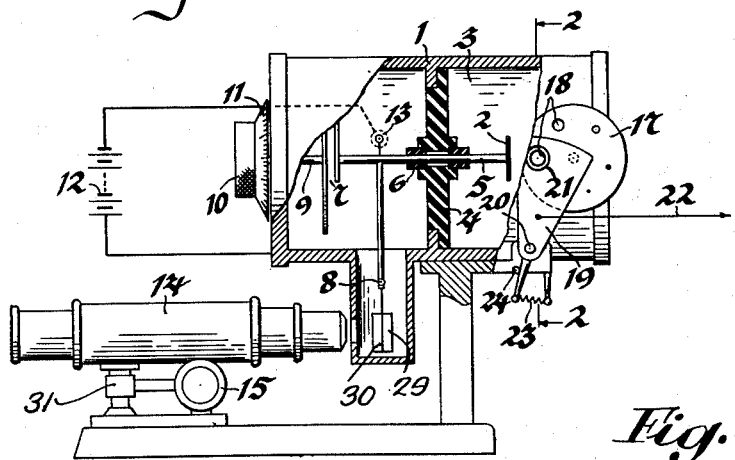
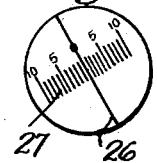
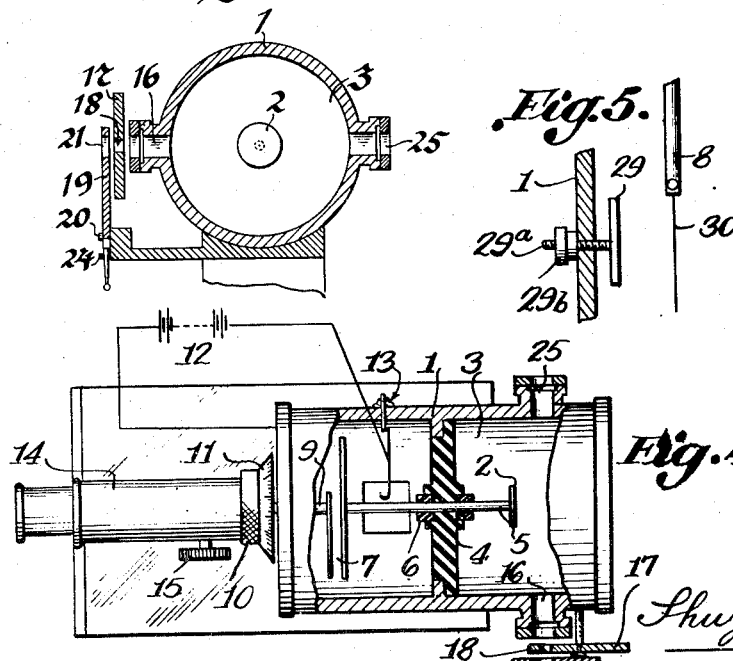

Patented Aug. 8, 1939

2,168,464

UNITED STATES PATENT OFFICE 2,168,464

ROENTGENOMETER

Shuzo Yeda, Tokyo, Japan, assignor to Choshichi Yamagoshi, Tokyo, Japan

Application February 5, 1937, Serial No. 124,191
In Japan October 3, 1936

6 Claims. (Cl. 250—83)

This invention relates to dosimeters or roentgenometers for measuring the intensity of a beam of Roentgen rays.

Generally, it is known that, in a chamber, air is ionized by projecting Roentgen rays thereinto, the degree of ionization thereby produced depending on the intensity of the rays. Various devices have been proposed to measure the intensity of the Roentgen rays by measuring the said degree of ionization.

According to this invention, the intensity of the Roentgen rays is measured by measuring the additional electric potential which is necessary to be supplied to make up the electric potential lost by the neutralization of ions in the chamber due to the projection of X-rays thereinto.

According to this invention, a variable condenser, one pole of which is electrically connected with an electrode arranged in the ionization chamber, is initially charged at a predetermined potential, and then a beam of X-rays is projected for a certain time into the ionization chamber to ionize the air in the chamber. The initial charge set up in the electrode arranged in the chamber, and consequently the initial charge in the pole connected with the said electrode, is reduced by the neutralization of ions in the chamber.

Next, by adjusting the variable condenser, the predetermined potential of the initial charge may be restored. The difference between the original position and the adjusted position of the movable pole of the variable condenser or the difference of indication of the dial of said condenser shows the additional potential employed to restore the initial charge and thus, indirectly, the intensity of the Roentgen rays. The variation of the potential of the condenser is indicated by an electrometer by means of which the potential of the initial charge may be observed and the potential of the restored charge may likewise be observed and caused to coincide therewith.

The principal object of the present invention is in increasing the constancy in operation of such an instrument, enabling accurate measurements to be carried out without periodical calibrations.

Another object of the invention is to provide an instrument by means of which measurements can be carried out for a wide range of intensity of Roentgen rays.

A further object of the invention is to provide an instrument in which stray radiations received by observers during measurements can safely be disregarded.

Other objects and various features of the invention making for economy in manufacture and efficiency in operation will be more apparent from the following description when read in connection with the accompanying drawing, in which, Figure 1 is an elevational view, partly in section and more diagrammatically illustrated, showing a dosimeter according to the invention.

Figure 2 is a fragmentary cross sectional view of the ionization chamber of the apparatus shown in Figure 1, section being taken at the line 2—2, Figure 1.

Figure 3 is a view of the fibre of an electrometer as observed through a microscope in association with a scale provided on a rotatable eyepiece of a microscope or other rotatable portion of the latter which is in the line of vision.

Figure 4 is a plan view of the device illustrated in Figure 1, partially broken away.

Referring to the drawing, and more particularly to Figures 1 and 2, 1 is a metallic casing for enclosing and shielding the main parts of the instrument and is preferably made of lead. 2 is a collecting electrode, preferably discoidal, projecting into an ionization chamber 3 formed within the casing by the rear wall of the casing and a partition wall 4, preferably of ebonite. The electrode 2 is mounted on a metallic rod 5 which is supported by and insulated from the partition wall 4 by means of amber rings 6. On the opposite end of the metallic rod 5 is mounted one pole or plate of the variable condenser 7 which is composed of a pair of semi-circular plates. The rod 5 is also connected to fibre electrometer 8. The said electrometer, as best seen in Fig. 5, comprises a substantially fixed plate 29 mounted upon and electrically connected to the casing 1 and a preferably gold covered quartz fiber 30 hanging in substantially parallel relation to said plate 29, but insulated therefrom. The plate 29 may preferably be carried on a threaded rod 29a which extends through the casing 1, and the horizontal adjustment of said plate relatively to the fiber 30 may be controlled by an adjusting nut 29b which is threaded upon said rod. The other plate of the variable condenser is mounted on a rod 9 which is extended to the outside of the casing 1 and rotatably supported by the front wall of the casing. To the outward extremity of the rod 9 is fixed a knob 10 provided with a dial or indicator 11 for regulating the variable condenser.

12 is a source of direct current, one terminal of which is connected through a push button 13 to the rod 5, and the other terminal is connected to the casing, as shown. 14 is a microscope for observing the fibre of the electrometer 8. The microscope is a commonly used type which is angularly adjustable about pivot 31 by operating a screw device 15, and also rotatably adjustable, at least in part, about its own axis.

It is common to provide, in such microscopes, an eye-piece which has formed thereon or therein, a scale 27. Any point on this scale, as for example, the zero mark, may be brought into horizontal register with matter being inspected by lateral adjustment of the microscope by the manipulation of the screw device 15, and such point may be brought into diagonal register with such matter by rotation of the eye-piece about the longitudinal axis of the microscope.

The lateral wall of the casing 1 is formed, at the portion adjacent the ionization chamber 3, with a window 16 for admitting therethrough a beam of X-rays, the intensity of which is to be measured. The effective opening of this window may be regulated by means of an adjustable stop 17 consisting of a rotatable disc provided with a series of apertures 18 of different diameters adapted to be brought at will in alignment with the window 16. 19 is a shutter rockably pivoted, as at 20, to the stationary part of the device and provided with an opening 21 which can also be brought to register with the said window 16. A provision may be made, as of a string 22, for controlling the shutter from a remote position, the shutter to be restored automatically to the closed position by means of a spring 23 when the said controlling means is released. A stop 24 is provided to suitably limit the movement of the shutter. At the diametrically opposite portion of the ionization chamber 3 there is formed another window 25 for allowing the beam to pass out of it.

To measure the intensity of X-rays, the variable condenser 7 is at first set at its full capacity and is charged, together with the collecting electrode 2 and the electrometer 8, at a certain known potential by pressing the key 13 thus causing the fibre 26, to be deflected and assume an angular or diagonal position. In this case, the potential at which the insulated system 2, 5, 7 and 8 is charged must be sufficiently high to cause the saturation current to flow in the ionization chamber 3.

Microscope 14 is then adjusted by moving the same angularly by means of adjustable screw 15 and rotating the same or its eyepiece or other rotatable part, with the scale 27, about the longitudinal axis of the microscope in such a manner that the fibre 26 of the electrometer as viewed through the microscope rests at zero position of its scale 27, as shown in Figure 3, whereupon the shutter 19 is opened for a certain predetermined short length of time for permitting X-rays to enter the ionization chamber 3 through the window 16 by way of one of the apertures 18 provided on the disc 17. After the exposure, the air in the chamber 3 is ionized, so that the electrode 2 is partially discharged and the potential thereof is reduced depending on the intensity of the X-rays. As a result, the fibre 26 of the electrometer has moved out of alignment with the zero line of the scale 27. The capacity of the variable condenser is then reduced by operating on the knob 10 so as to bring the potential of the insulated system back to its initial value of electric potential, as indicated by the return of the fibre 26 to zero position on the scale 27, and the reading is then taken at the dial or indicator 11.

At a fixed condition, there exists a certain linear relationship between the intensity of X-rays and the decrease of capacity of the variable condenser. Therefore, it is possible to measure indirectly the intensity of X-rays by differences in the readings taken at the dial 11 before the projection of the X-rays into the ionization chamber and after the restoration of the potential of the insulated system by changing the capacity of the variable condenser 7.

According to the present invention, the measurement is carried out in such a manner that the electrometer is always returned to its zero position, as above mentioned. Consequently, it is not necessary to make periodic calibrations as in the case of known dosimeters of this sort.

By the provision of the shutter 19 it is made possible to admit X-rays into the ionization chamber 3 at a certain constant condition of radiation. Moreover, the observer is protected from stray radiations, as there is no need to observe the movement of fibre under a radiated condition. The adjustable stop consisting of a disc provided with apertures of different sizes serves to control the range of X-ray intensity which can be measured.

What I claim is:

1. A roentgenometer or the like, comprising a metallic casing including an ionization chamber provided with an opening for admitting X-rays thereinto, an electrode projecting into said chamber and insulated from said casing, an electrometer electrically connected to said electrode, optical means for observing the condition of said electrometer, and a variable condenser one plate of which is electrically connected with said electrode and electrometer and the other plate of which is adjustable and has an indicator connected thereto, permitting observation and comparison of the various settings of said condenser, the latter being a part of an electric circuit which includes said electrode and electrometer and being adapted, by variation thereof, to provide compensation in said circuit for potential changes caused therein by the admission of X-rays into the ionization chamber.

2. A roentgenometer or the like, according to claim 1, further characterized in including a source of electric energy connected to and adapted to establish an electric potential in said electrode and electrometer prior to the admission of X-rays into the ionization chamber.

3. A roentgenometer or the like, according to claim 1, further characterized in including an adjustable stop disposed adjacent to said opening and adapted to variably control the breadth of the beam of rays to be admitted into the ionization chamber.

4. A roentgenometer or the like, according to claim 1, further characterized in including a shutter for shutting off said opening at will.

5. A roentgenometer or the like, according to claim 1, further characterized in including an adjustable stop for controlling the beam of rays to be admitted into the ionization chamber, and a shutter for shutting off said beam at will, the said adjustable stop comprising a rotatable disc with a series of apertures of different sizes.

6. A roentgenometer or the like, according to claim 1, further characterized in that the electrometer is disposed exteriorly of the ionization chamber.

SHUZO YEDA.

CERTIFICATE OF CORRECTION.

Patent No. 2,168,464. August 8, 1939.

SHUZO YEDA.

It is hereby certified that error appears in the printed specification of the above numbered patent requiring correction as follows: Page 1, second column, line 20, after the word and period "away." insert the following paragraph -

Fig. 5 is a fragmental vertical sectional view on the line 5—5 of Fig. 1 illustrating the details of an electrometer which may be employed in the present invention.

and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.